US011164583B2

(12) United States Patent
Ye et al.

(10) Patent No.: US 11,164,583 B2
(45) Date of Patent: Nov. 2, 2021

(54) VOICE PROCESSING METHOD AND APPARATUS

(71) Applicant: BAIDU ONLINE NETWORK TECHNOLOGY (BEIJING) CO., LTD., Beijing (CN)

(72) Inventors: Jingyu Ye, Beijing (CN); Mengmeng Zhang, Beijing (CN); Wenming Wang, Beijing (CN); Zhilin Liu, Beijing (CN)

(73) Assignees: BAIDU ONLINE NETWORK TECHNOLOGY (BEIJING) CO., LTD., Beijing (CN); SHANGHAI XIAODU TECHNOLOGY CO. LTD., Shanghai (CN)

( * ) Notice: Subject to any disclaimer, the term of this patent is extended or adjusted under 35 U.S.C. 154(b) by 124 days.

(21) Appl. No.: 16/703,505

(22) Filed: Dec. 4, 2019

(65) Prior Publication Data

US 2020/0410999 A1    Dec. 31, 2020

(30) Foreign Application Priority Data

Jun. 27, 2019    (CN) .......................... 201910567044.5

(51) Int. Cl.
G10L 15/22        (2006.01)
G10L 17/00        (2013.01)
(Continued)

(52) U.S. Cl.
CPC .............. G10L 15/22 (2013.01); G06F 3/165 (2013.01); G06F 3/167 (2013.01); H04N 21/47202 (2013.01); G10L 2015/223 (2013.01)

(58) Field of Classification Search
CPC .............. G10L 15/22; G10L 2015/223; G03G 15/5016; G03G 2215/00122; H04N 1/00408; G06F 3/0482
(Continued)

(56) References Cited

U.S. PATENT DOCUMENTS

2013/0024197 A1*    1/2013  Jang ................... H04N 21/4345
                                                          704/246
2019/0147052 A1     5/2019  Lu
(Continued)

FOREIGN PATENT DOCUMENTS

CN       103281683 A    9/2013
CN       104423924 A    3/2015
(Continued)

OTHER PUBLICATIONS

The first Office Action of parallel JP application.
(Continued)

Primary Examiner — George C Monikang
(74) Attorney, Agent, or Firm — J.C. Patents

(57) ABSTRACT

Provided are a voice processing method and an apparatus, the method including: acquiring, during playback of a content of a first type, a first voice inputted by a user, where the first voice instructs a terminal to switch a played content to a content of a second type; and where the terminal plays a content of a predefined type before playing the content of the first type; playing a first reply voice according to the first voice, prompting the user to determine whether to continue to play the content of the second type after the content of the predefined type during a predefined period; and continuing to play a content of a target type after the content of the predefined type during the predefined period, where the target type is related to the user's feedback on the first reply voice, thus improving a reliability for the terminal.

19 Claims, 8 Drawing Sheets

(51) Int. Cl.
*G06F 3/16* (2006.01)
*H04N 21/472* (2011.01)

(58) Field of Classification Search
USPC .................................................. 704/231, 246
See application file for complete search history.

(56) References Cited

U.S. PATENT DOCUMENTS

| | | | |
|---|---|---|---|
| 2019/0147863 A1 | 5/2019 | Lu | |
| 2019/0147864 A1 | 5/2019 | Lu | |
| 2020/0014981 A1* | 1/2020 | Niles | H04N 21/441 |

FOREIGN PATENT DOCUMENTS

| | | |
|---|---|---|
| CN | 107871500 A | 3/2015 |
| CN | 105679318 A | 6/2016 |
| CN | 107895016 A | 6/2016 |
| CN | 107832434 A | 3/2018 |
| CN | 107871500 A | 4/2018 |
| CN | 107895016 A | 4/2018 |
| CN | 109036388 A | 12/2018 |
| JP | 2010204442 A | 9/2010 |
| JP | 2017535798 A | 11/2017 |
| JP | 2018097029 A | 6/2018 |
| JP | 2019091014 A | 6/2019 |
| JP | 2019101264 A | 6/2019 |
| KR | 20100058318 * | 6/2010 |

OTHER PUBLICATIONS

The first OA of priority CN application.
"Design and Application of a Large Digital Broadcasting Audio", Satellite and Program Transmission, vol. 250, Feb. 2013, pp. 73-76.
"Multi speaker detection and tracking using audio and video sensors with gesture analysis", Tenth International Conference on Wireless and Optical Communications Networks (WOCN), 2013.

* cited by examiner

VOICE PROCESSING METHOD AND APPARATUS

CROSS-REFERENCE TO RELATED APPLICATION

This application claims priority to Chinese Patent Application No. 201910567044.5, filed on Jun. 27, 2019, which is hereby incorporated by reference in its entirety.

TECHNICAL FIELD

Embodiments of the present application relate to computer technology and, in particular, to a voice processing method and an apparatus.

BACKGROUND

Nowadays, smart speakers are gaining popularity. A smart speaker can play contents concerning a user's daily life, such as weather forecast. The smart speaker can also allow for simple sessions with the user, execute voice instructions from the user and fulfill the user's needs, all of which making it the favor of many households.

However, the content played on an existing smart speaker might not be what a user wants. That is, the existing smart speaker does not have a high reliability.

SUMMARY

Embodiments of the present application provide a voice processing method and an apparatus, improving reliability for a terminal.

In a first aspect, an embodiment of the present application provides a voice processing method, including: when a terminal is playing a content of a first type, acquiring, by the terminal, a first voice inputted by a user, where the first voice instructs the terminal to switch a played content to a content of a second type; and where the terminal plays a content of a predefined type before playing the content of the first type; playing, by the terminal, a first reply voice according to the first voice, where the first reply voice is used to ask the user to determine whether to continue to play the content of the second type after finishing a playback of the content of the predefined type during a predefined period; and continuing to play, by the terminal, a content of a target type after finishing the playback of the content of the predefined type during the predefined period, where the target type is related to the user's feedback on the first reply voice.

In this solution, a type of the content played by the terminal may be adjusted as needed by the user. Thus, the terminal may play a content conforming to the user's need, thereby improving the reliability of the terminal.

In conjuncture with the first aspect, in a possible implementation of the first aspect, the method further includes: sending, by the terminal, the first voice to a server.

In conjuncture with the first aspect, in a possible implementation of the first aspect, the method further includes: receiving, by the terminal, the content of the target type from the server during the predefined period.

In conjuncture with the first aspect, in a possible implementation of the first aspect, the playing, by the terminal, a first reply voice according to the first voice includes: if the first voice includes slot information, playing, by the terminal, the first reply voice according to the slot information; and if the first voice does not include slot information, playing, by the terminal, a predefined voice according to the first voice, where the predefined voice is the first reply voice.

In conjuncture with the first aspect, in a possible implementation of the first aspect, the method further includes: receiving, by the terminal from the server, the first reply voice according to the first voice.

In conjuncture with the first aspect, in a possible implementation of the first aspect, before the continuing to play, by the terminal, a content of a target type after finishing the playback of the content of the predefined type during the predefined period, the method further includes: acquiring, by the terminal, a second voice inputted by the user during a first predefined duration since a playtime of the first reply voice, and determining, by the terminal, the target type according to the second voice, where the second voice is the user's feedback on the first reply voice, and the second voice is a positive or negative response by the user to the first reply voice.

In conjuncture with the first aspect, in a possible implementation of the first aspect, the determining, by the terminal, the target type according to the second voice includes: if the second voice is a positive response by the user to the first reply voice, determining, by the terminal, that the second type is the target type; and if the second voice is a negative response by the user to the first reply voice, determining, by the terminal, that the first type is the target type.

In conjuncture with the first aspect, in a possible implementation of the first aspect, the method further includes: playing, by the terminal, a second reply voice according to the second voice.

In conjuncture with the first aspect, in a possible implementation of the first aspect, after acquiring, by the terminal, the second voice, the method further includes: playing the content of the second type.

In conjuncture with the first aspect, in a possible implementation of the first aspect, the method further includes: sending, by the terminal, a second voice to a server.

In conjuncture with the first aspect, in a possible implementation of the first aspect, the method further includes: receiving, by the terminal from the server, a second reply voice according to the second voice.

In conjuncture with the first aspect, in a possible implementation of the first aspect, after the acquiring, by the terminal, a second voice, the method further includes: receiving, by the terminal from the server, the content of the second type.

In conjuncture with the first aspect, in a possible implementation of the first aspect, the method further includes: acquiring, by the terminal, a third voice inputted by the user during a first predefined duration since a playtime of the first reply voice, where the third voice instructs the terminal to switch the played content to a content of a third type, and the third voice is the user's feedback on the first reply voice; and playing, by the terminal, the content of the third type; correspondingly, the target type is the first type.

In conjuncture with the first aspect, in a possible implementation of the first aspect, the method further includes: sending, by the terminal, a third voice to a server.

In conjuncture with the first aspect, in a possible implementation of the first aspect, the method further includes: receiving, by the terminal from the server, the content of the third type.

In conjuncture with the first aspect, in a possible implementation of the first aspect, the method further includes: playing, by the terminal, the content of the second type if no reply to the first reply voice is acquired from the user, or if a fourth voice is acquired, by the terminal during a first predefined duration since a playtime of the first reply voice, where the fourth voice does not indicate any play type and the fourth voice is the user's feedback on the first reply voice; correspondingly, the target type is the first type.

In conjuncture with the first aspect, in a possible implementation of the first aspect, the method further includes: sending, by the terminal, a fourth voice to a server.

In conjuncture with the first aspect, in a possible implementation of the first aspect, if no reply to the first reply voice is acquired from the user, or if a fourth voice is acquired, by the terminal during a first predefined duration since a playtime of the first reply voice, the method further includes: receiving, by the terminal from the server, the content of the second type.

In conjuncture the first aspect, and in a possible implementation of the first aspect, before the playing, by the terminal, a first reply voice according to the first voice, the method further includes: determining, by the terminal, that the content of the first type has been played for a duration less than or equal to a second predefined duration.

In a second aspect, an embodiment of the present application provides a voice processing method, including: when a terminal is playing a content of a first type, receiving, by a server, a first voice from the terminal, where the first voice instructs the terminal to switch a played content to a content of a second type; and where the terminal plays a content of a predefined type before playing the content of the first type; acquiring, by the server, a first reply voice according to the first voice; sending, by the server, the first reply voice to the terminal to enable the terminal to play the first reply voice, where the first reply voice is used to ask the user to determine whether to continue to play the content of the second type after finishing a playback of the content of the predefined type during a predefined period; and pushing, by the server, a content of a target type to the terminal during the predefined period, where the target type is a type of a content that the terminal continues to play after finishing the playback of the content of the predefined type during the predefined period, the target type is related to the user's feedback on the first reply voice.

In conjuncture with the second aspect, in a possible implementation of the second aspect, the acquiring, by the server, a first reply voice according to the first voice includes: if the first voice includes slot information, determining, by the server, the first reply voice according to the slot information; and if the first voice does not include slot information, determining, by the server, that a predefined voice is the first reply voice according to the first voice.

In conjuncture with the second aspect, in a possible implementation of the second aspect, the method further includes: receiving, by the server, a second voice from the terminal, where the second voice is the user's feedback on the first reply voice, and the second voice is a positive or negative response by the user to the first reply voice; and determining, by the server, the target type according to the second voice.

In conjuncture with the second aspect, in a possible implementation of the second aspect, the determining, by the server, the target type according to the second voice includes: if the second voice is a positive response by the user to the first reply voice, determining, by the server, that the second type is the target type; and if the second voice is a negative response by the user to the first reply voice, determining, by the server, that the first type is the target type.

In conjuncture with the second aspect, in a possible implementation of the second aspect, the method further includes: pushing, by the server, the content of the second type to the terminal to enable the terminal to play the content of the second type.

In conjuncture with the second aspect, in a possible implementation of the second aspect, the method further includes: receiving, by the server, a third voice from the terminal, where the third voice is the user's feedback on the first reply voice, and the third voice instructs the terminal to switch the played content to a content of a third type; and pushing, by the server according to the third voice, the content of the third type to the terminal to enable the terminal to play the content of the third type.

In conjuncture with the second aspect, in a possible implementation of the second aspect, the method further includes: receiving, by the server, a fourth voice from the terminal, where the fourth voice is the user's feedback on the first reply voice and the fourth voice does not indicate any play type; and pushing, by the server according to the fourth voice, the content of the second type to the terminal to enable the terminal to play the content of the second type; correspondingly, the target type is the first type.

In conjuncture with the second aspect, in a possible implementation of the second aspect, in case that the user makes no reply to the first reply voice, the method further includes: pushing, by the server, the content of the second type to the terminal to enable the terminal to play the content of the second type; correspondingly, the target type is the first type.

In conjuncture with the second aspect, in a possible implementation of the second aspect, before the acquiring, by the server, a first reply voice according to the first voice, the method further includes: determining, by the server, that the content of the first type has been played by the terminal for a duration less than or equal to a second predefined duration.

In a third aspect, an embodiment of the present application provides a terminal, including: a memory and a processor; where the memory is connected to the processor; the memory is configured to store program instructions; and the processor is configured to implement the method according to the first aspect or any possible implementation thereof when the program instructions are executed.

In a fourth aspect, an embodiment of the present application provides a server, including: a memory and a processor; where the memory is connected to the processor; the memory is configured to store program instructions; and the processor is configured to implement the method according to the second aspect or any possible implementation thereof when the program instructions are executed.

In a fifth aspect, an embodiment of the present application provides a computer readable storage medium storing thereon a computer program, where the computer program, when executed by a processor, implements the method according to the first aspect or any possible implementation thereof, or implements the method according to the second aspect or any possible implementation thereof.

In the present application, a type of the content played by the terminal may be adjusted as needed by the user. Thus, the terminal may play a content conforming to the user's need, thereby improving the reliability of the terminal.

BRIEF DESCRIPTION OF THE DRAWINGS

In order to more clearly illustrate the embodiments of the present application or the technical solutions in the prior art, the drawings required in describing the embodiments or the prior art will be briefly introduced below. Apparently, the drawings described in the following are for some embodiments of the present application, and other drawings can be obtained by those skilled in the art from these drawings without paying any creative labor.

DETAILED DESCRIPTION OF THE EMBODIMENTS

In order to make objectives, technical solutions and advantages of embodiments of the present application clearer, the technical solutions in the embodiments of the present application will be described below clearly and comprehensively with reference to accompanying drawings. Obviously, the described embodiments are only a part of embodiments of the present application, rather than all of them. Based on the embodiments of the present application, all other embodiments obtained by persons of ordinary skill in the art without making any creative effort shall fall within the protection scope of the present application.

Figure 1:
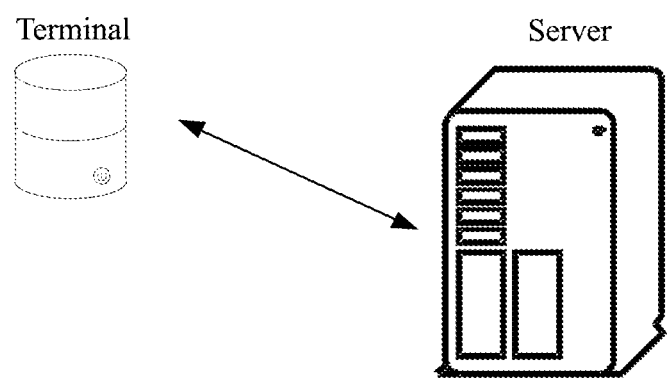
FIG. 1 is a schematic diagram of a system architecture according to an embodiment of the present application.

FIG. 1 is a schematic diagram of a system architecture according to an embodiment of the present application. Referring to FIG. 1, the system architecture of the embodiment includes a server and a terminal. The server is used to pushing content to the terminal, and the terminal is used to play the content pushed by the server.

The terminal may be a smart speaker.

Figure 2:
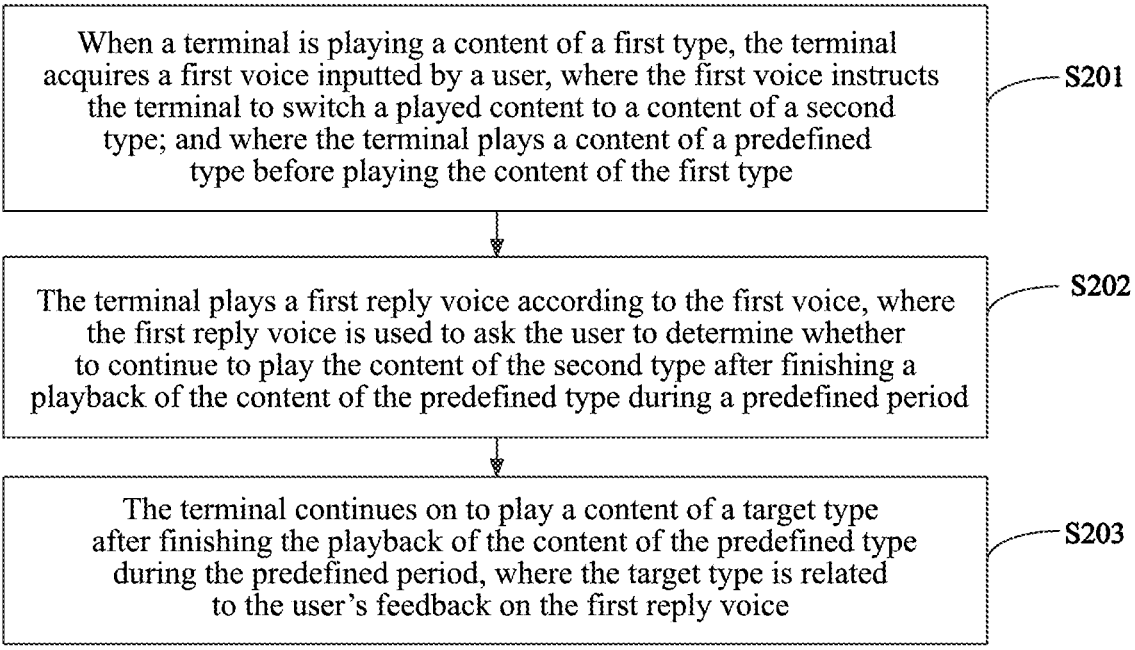
FIG. 2 is a flowchart of a voice processing method provided in an embodiment of the present application.

FIG. 2 is a flowchart illustrating a voice processing method provided in an embodiment of the present application. As shown in FIG. 2, the method of the embodiment may include:

Step S201: When a terminal is playing a content of a first type, the terminal acquires a first voice inputted by a user, where the first voice instructs the terminal to switch a played content to a content of a second type; and where the terminal plays a content of a predefined type before playing the content of the first type.

The terminal in the embodiment may be a smart speaker capable of playing voice. The smart speaker can play contents of one or more types in an order. For instance, it may begin from a weather forecast, than play contents of one or more types, such as music, news, and outfits in turn.

Optionally, the first type in the embodiment may be any one of various play types that have been pre-configured for the terminal before a current date, and the predefined type may be one of the various types the terminal plays before playing the first type.

Illustratively, if the various play types that have been pre-configured for the terminal before the current date are weather forecast, news, music and outfits in turn, then the first type may be any one type of weather forecast, news, music and outfits. When the first type is news, the predefined type is weather forecast. When the first type is music, both weather forecast and news may be the predefined type.

Illustratively, if the various play types that have been pre-configured for the terminal before the current date are weather forecast and news in turn, then the first type may be any one type of weather forecast and news. When the first type is news, the predefined type is weather forecast.

Optionally, the first type may be any one of various play types, except weather forecast, that have been pre-configured for the terminal before the current date.

Illustratively, if the various play types that have been pre-configured for the terminal before the current date are weather forecast, news, music and outfits in turn, then the first type may be any one type of news, music and outfits. When the first type is news, the predefined type is weather forecast. When the first type is music, both weather forecast and news may be the predefined type.

Illustratively, if the various play types that have been pre-configured for the terminal before the current date are weather forecast and news in turn, then the first type may be news, and the predefined type is weather forecast.

Regarding the first voice: if the content of the first type played by the terminal is a content related to music, and the second type is news, the first voice may be "I'd like some sci-tech news". That is, the first voice at least includes information indicating the second type.

Step S202: The terminal plays a first reply voice according to the first voice, where the first reply voice is used to ask the user to determine whether to continue to play the content of the second type after finishing a playback of the content of the predefined type during a predefined period.

Optionally, the predefined period in the embodiment of the present application may be a period after a current use of the terminal has ended. For instance, the predefined period may be a period after the current data.

In a solution, the terminal recognizes the first voice after acquiring the first voice inputted by the user, and then determines and plays the first reply voice according to the first voice after determining t that the first type is not the same as the second type, where the first reply voice is used to ask the user to determine whether to continue to play the content of the second type after finishing the playback of the content of the predefined type during the predefined period.

In another solution, the terminal sends the first voice to a server after acquiring the first voice inputted by the user. The server receives the first voice, determines the first reply voice according to the first voice after determining t that the first type is not the same as the second type, and then sends the first reply voice to the terminal. The terminal plays the first reply voice according to the first voice, where the first reply voice is used to ask the user to determine whether to continue to play the content of the second type after finishing the playback of the content of the predefined type during the predefined period.

Specifically, the terminal or server determining the first reply voice according to the first voice may include: if the first voice corresponds to slot information, the terminal or server determining the first reply voice according to the slot information corresponding to the first voice; and if the first voice does not correspond to any slot information, determining that a predefined voice is the first reply voice, that is, the first reply voice is predefined. The slot information refers to information that can be used in identifying a subordinate type of the second type or a subdivision type of the second type.

The terminal or server determining the first reply voice according to the slot information corresponding to the first voice includes: terminal or server determining the first reply voice according to the slot information corresponding to the first voice and a priority of the slot information corresponding to the first voice. In one approach, when the first voice corresponds to slot information, the first reply voice includes slot information with the highest priority among all the slot information corresponding to the first voice.

Now, the first reply voice will be explained by way of Examples 1 to 5.

In Example 1, the second type is news, corresponding to slots that may include: city, category, sort-type and album. Priorities of the slots are ranked from high to low as: album, category, city and sort-type. A priority of a slot is the same as a priority of the slot information.

If the first voice is "I'd like to hear Taiyuan sports news", where "Taiyuan" and "sports" are both slot information corresponding to the first voice. The information "Taiyuan" belongs to the slot "city", the information "sports" belongs to the slot "category", which has a higher priority than the "city". Thus, the first reply voice includes "sports" and "news". For instance, the first reply voice may be: "OK. By the way, whether to play sports news for you after 'xx' everyday from now on?", where "xx" is a type of the content in the vicinity of the content of the first type in the content of the predefined type being played by the terminal before the content of the first type is played by the terminal. For instance, before playing the content of the first type, the types of the content played by the terminal are weather forecast and outfits in turn. After playing outfits, the content of the first type is played. Then, "xx" is "outfits". For another instance, when there is only one predefined type, e.g., "weather forecast", then the first reply voice could be: "OK. By the way, whether to play sports news for you after 'weather forecast' everyday from now on?" In one approach, when the content in the "weather forecast" may be referred to as "Good morning", then the first reply voice could be: "OK. By the way, whether to play sports news for you after 'Good morning' everyday from now on?" The "xx" will carry the same meaning hereinafter without repeatedly specifying the same.

If the first voice is "I'd like to hear economic news", where "economic" is the slot information corresponding to the first voice. The information "economic" belongs to the slot "category", thus the first reply voice includes "economic" and "news". For instance, the first reply voice could be: "OK. By the way, whether to play economic news for you after 'xx' everyday from now on?"

If the first voice is "I'd like to hear today's morning news", where "today's morning" indicates "latest", which is the slot information corresponding to the first voice. The information "latest" belongs to the slot "sort-type", thus the first reply voice includes "latest" and "news". For instance, the first reply voice could be: "OK. By the way, whether to play the latest news for you after 'xx' everyday from now on?"

If the first voice is "I'd like to hear the CCTV News", where "CCTV News" is the slot information corresponding to the first voice. The information "CCTV News" belongs to the slot "album", thus the first reply voice includes "CCTV News". For instance, the first reply voice could be: "OK. By the way, whether to play CCTV News for you after 'xx' everyday from now on?"

If the first voice is "I'd like to hear some news", which does not correspond to any slot information, the first reply voice would be the predefined voice. For instance, the predefined voice could be: "OK. By the way, whether to play news for you after 'xx' everyday from now on?"

In Example 2, the second type is music other than kids' music, corresponding to slots that may include: tag, and unit. Priorities of the slots are ranked from high to low as: unit, and tag. A priority of a slot is the same as a priority of the slot information.

If the first voice is "I'd like to hear piano music by Leslie Cheung", where "piano music" is the slot information corresponding to the first voice. The information "piano music" belongs to the slot "tag", thus the first reply voice includes "piano music". For instance, the first reply voice could be: "OK. By the way, whether to play piano music for you after 'xx' everyday from now on?"

If the first voice is "I'd like to hear piano music in My Favorite Songs", where "piano music" and "My Favorite Songs" are slot information corresponding to the first voice. The information "piano music" belongs to the slot "tag", and the information "My Favorite Songs" belongs to the slot "unit", which has a higher priority than the "tag", thus, the first reply voice includes "My Favorite Songs". For instance, the first reply voice could be: "OK. By the way, whether to play 'My Favorite Songs' for you after 'xx' everyday from now on?".

If the first voice is "I'd like to hear 'I went too far' by Jeff Chang", which does not correspond to any slot information, the first reply voice would be the predefined voice. For instance, the predefined voice could be: "OK. By the way, whether to play music for you after 'xx' everyday from now on?"

If the first voice is "I'd like to hear some music", which does not correspond to any slot information, the first reply voice would be the predefined voice. For instance, the predefined voice could be: "OK. By the way, whether to play music for you after 'xx' everyday from now on?"

In Example 3, the second type is kids' music, which does not correspond to any slot.

If the first voice is "I'd like to hear some kids' music", which does not correspond to any slot information, the first reply voice would be the predefined voice. For instance, the predefined voice could be: "OK. By the way, whether to play kids' music for you after 'xx' everyday from now on?"

In Example 4, the second type is audio program other than live cast, corresponding to slots that may include: L1 category, L2 category, and program name. Priorities of the slots are ranked from high to low as: program name, L2 category, L1 category. A priority of a slot is the same as a priority of the slot information.

If the first voice is "I'd like to hear the storytelling Three Swordsmen", where "storytelling" and "Three Swordsmen" are slot information corresponding to the first voice. The information "storytelling" belongs to the slot "L1 category", and the information "Three Swordsmen" belongs to the slot "program name", which has a higher priority than the "L1 category". Thus, the first reply voice includes "Three Swordsmen". For instance, the first reply voice may include: "OK. By the way, whether to play Three Swordsmen for you after 'xx' everyday from now on?"

If the first voice is "I'd like to hear Super Wings", where "Super Wings" is the slot information corresponding to the first voice. The information "Super Wings" belongs to the slot "program name", thus the first reply voice includes "Super Wings". For instance, the first reply voice could be: "OK. By the way, whether to play Super Wings for you after 'xx' everyday from now on?"

If the first voice is "I'd like to hear a story", where "story" is the slot information corresponding to the first voice. The information "story" belongs to the slot "L2 category", thus the first reply voice includes "story". For instance, the first reply voice could be: "OK. By the way, whether to play a story for you after 'xx' everyday from now on?"

In Example, the second type is live audio cast, corresponding to a slot that may be channel name.

If the first voice is "I'd like to hear Voice Of China", where "Voice Of China" is the slot information corresponding to the first voice. The information "Voice Of China" belongs to the slot "channel name", thus the first reply voice includes "Voice Of China". For instance, the first reply voice could be: "OK. By the way, whether to play Voice Of China for you after 'xx' everyday from now on?"

The first reply voice has been explained via the above examples.

Those skilled will appreciate that the terminal or server may not determine the first reply voice when the first type is the same as the second type, then the terminal also does not play the first reply voice. Rather, the terminal may continue playing the content of the first type. Accordingly, the server may continue pushing the content of the first type to the terminal.

Optionally, before the terminal or server determines the first reply voice according to the first voice, the method may further include: determining that the content of the first type has been played by the terminal for a duration less than or equal to a second predefined duration when the terminal acquires the first voice. That is, if the content of the first type has been played by the terminal for a duration longer than the second predefined duration when the terminal acquires the first voice, no determination has to be made on the first reply voice. Rather, the terminal may continue playing the content of the first type, and accordingly, the server may continue pushing the content of the first type to the terminal. This is because the user has let the content of the first type to be played for a certain duration before inputting the voice to change the play type. This fact means that the user is fairly satisfied with the content of the first type, and the order of the play type for the terminal does not have to be updated, which, to some extent, enhances the reliability of the terminal and may reduce a power consumption of the terminal.

The second predefined duration may be any quantity within 3 to 5 minutes (min).

Step S203: The terminal continues to play a content of a target type after finishing the playback of the content of the predefined type during the predefined period, where the target type is related to the user's feedback on the first reply voice.

The user may provide the feedback for the first reply voice after the terminal plays the first reply voice. For instance, the user may input a second voice, a third voice or a fourth voice during a first predefined duration since a playtime of the first reply voice, and the second voice, third voice or fourth voice are acquired by the terminal. The second voice is a positive or negative response by the user to the first reply voice, the third voice instructs the terminal to switch the played content to a content of a third type, and the fourth voice does not indicate any play type.

Firstly, explanations will be given to subsequent voice processing methods when the second voice has been acquired by the terminal as the user's feedback on the first reply voice.

In an implementation, at least one of the steps a1 to a3 may be included in a subsequent voice processing method when the second voice has been acquired by the terminal as the user's feedback on the first reply voice.

a1: The terminal plays the content of the second type.

The terminal recognizes the second voice after acquiring the same, and determines that whether the second voice is a positive or negative response by the user to the first reply voice. An example of the positive response can be "all right", "sure", "no problem", "OK". The terminal may store a positive response lexical set, according to which the terminal can determine that the second voice is a positive response by the user to the first reply voice. The terminal can also determine that the second voice is a positive response by the user to the first reply voice according to a machine learning algorithm. An example of the negative response can be "no", "no need". The terminal may store a negative response lexical set, according to which the terminal can determine that the second voice is a negative response by the user to the first reply voice. The terminal can also determine that the second voice is a negative response by the user to the first reply voice according to a machine learning algorithm.

After the terminal determines that whether the second voice is a positive or negative response by the user to the first reply voice:

In an approach, a request for pushing the content of the second type is sent to the server. According to the request for pushing the content of the second type, the server pushes the content of the second type to the terminal. The terminal receives the content of the second type pushed by the server and plays the same.

In another approach, the terminal determines and plays the second reply voice according to the second voice, and sends a request for pushing the content of the second type to the server. According to the request for pushing the content of the second type, the server pushes the content of the second type to the terminal. The terminal receives the content of the second type pushed by the server. After playing the second reply voice, the terminal plays the content of the second type.

If the second voice is a positive response by the user to the first reply voice, the second reply voice may be "OK, got it". If the second voice is a negative response by the user to the first reply voice, the second reply voice may be "OK, sorry for the trouble".

It can be understand that a period that the terminal in a1 plays the content of the second type is a period during which the terminal is being used.

a2: The terminal determines the target type according to the second voice.

If the second voice is a positive response by the user to the first reply voice, the terminal determines that the second type is the target type. If the second voice is a negative response by the user to the first reply voice, the terminal determines that the first type is the target type.

Optionally, when the second voice is a negative response by the user to the first reply voice, the terminal may not perform the operation of determining the target type.

The execution of the above a1 and a2 are not limited to the same order in this embodiment.

a3: The terminal continues to play the content of the target type after finishing the playback of the content of the predefined type during the predefined period.

When the terminal continuing to play the content of the target type after finishing the playback of the content of the predefined type means that terminal plays the content of the target type immediately after finishing the playback of the content of the predefined type.

In case that the second voice is a positive response by the user to the first reply voice, the terminal continues to play the content of the second type after finishing the playback of the content of the predefined type during the predefined period. As described above, before the first voice is acquired by the current terminal, the terminal continues to play the content of the first type after finishing the playback of the content of the predefined type. Instead, during the predefined period, the terminal continues to play the content of the second type after finishing the playback of the content of the predefined type. That is, the content played by the terminal has been updated according to the user's need, which fulfills the user's need, and thereby improving the reliability of the terminal.

In case the second voice is a negative response by the user to the first reply voice, the fact that the second voice is a negative response by the user to the first reply voice means that the user does not desire that the terminal continues to play the content of the second type after finishing the playback of the content of the predefined type during the predefined period. Thus, the terminal continues playing the content of the first type after finishing the playback of the content of the predefined type during the predefined period. That is, the terminal has considered the user's needs in playing the content, thereby improving the reliability of the terminal.

Those skilled will appreciate that, next time the user uses the terminal, the terminal will continue to play the content of the target type after finishing the playback of the content of the predefined type, until the type of the content played by the terminal is updated again.

It can be appreciated that the following a31 and a32 may also be included before a3.

a31: The terminal sends configuration information to the server, where the configuration information indicating to the server that the terminal needs to continue to play the content of the target type after finishing the playback of the content of the predefined type.

After receiving the configuration information, the server updates the order of the types of contents played by the terminal: first information is updated to second information, where the first information is information about the content of the first type that the terminal needs to play after finishing the playback of the content of the predefined type, and the second information is information about the content of the second type that the terminal needs to play after finishing the playback of the content of the predefined type.

The a31 is optional, meaning that a31 may be absent in case that the second voice is a negative response by the user to the first reply voice.

a32: The server pushes the content of the target type to the terminal during the predefined period.

In another implementation, at least one of the steps b1 to b3 may be included in a subsequent voice processing method when the second voice has been acquired by the terminal as the user's feedback on the first reply voice.

b1: The terminal sends the second voice to the server, where the second voice is used for the server to determine the target type.

The server receives the second voice, and determines the target type according to the second voice. Specifically, after receiving the second voice, the server recognizes the second voice, and determines that whether the second voice is a positive or negative response by the user to the first reply voice. An example of the positive response can be "all right", "sure", "no problem", "OK". The server may store a positive response lexical set, according to which the server can determine that the second voice is a positive response by the user to the first reply voice. The server can also determine that the second voice is a positive response by the user to the first reply voice according to a machine learning algorithm. An example of the negative response can be "no", "no need". The server may store a negative response lexical set, according to which the server can determine that the second voice is a negative response by the user to the first reply voice. The server can also determine that the second voice is a negative response by the user to the first reply voice according to a machine learning algorithm.

After the server determines that whether the second voice is a positive or negative response by the user to the first reply voice, the server may determine the target type according to the second voice. If the second voice is a positive response by the user to the first reply voice, the server determines that the second type is the target type. Also, first information is updated to second information, where the first information is information about the content of the first type that the terminal needs to play after finishing the playback of the content of the predefined type, and the second information is information about the content of the second type that the terminal needs to play after finishing the playback of the content of the predefined type.

If the second voice is a negative response by the user to the first reply voice, the server determines that the first type is the target type. Optionally, if the second voice is a negative response by the user to the first reply voice, the server may also not perform the operation of determining the target type.

b2: The terminal plays the content of the second type.

After the server determines that whether the second voice is a positive or negative response by the user to the first reply voice:

In an approach, the server pushes the content of the second type to the terminal. The terminal receives the content of the second type pushed by the server and plays the same.

In another approach, the server determines the second reply voice according to the second voice, and sends the second reply voice to the terminal. The terminal plays the second reply voice. The server also pushes the content of the second type to the terminal. The terminal receives the content of the second type pushed by the server, and plays the content of the second type after playing the second reply voice. Details about the second reply voice may be reference to the above illustrations.

It can be understand that a period that the terminal in b2 plays the content of the second type is a period during which the terminal is being used.

b3: The terminal continues to play the content of the target type after finishing the playback of the content of the predefined type during the predefined period.

During the predefined period, the terminal receives the content of the target type pushed by the server, and continues to play the content of the target type after finishing the playback of the content of the predefined type.

Secondly, explanations will be given to subsequent voice processing methods when the third voice has been acquired by the terminal as the user's feedback on the first reply voice.

At least one of the steps c1 to c2 may be included in a subsequent voice processing method when the third voice has been acquired by the terminal as the user's feedback on the first reply voice.

c1: The terminal plays the content of the third type.

In an approach, the terminal recognizes the third voice after acquiring the same, and determines that the third voice instructs the terminal to switch the played content to the content of the third type.

After determining that the third voice instructs the terminal to switch the played content to the content of the third type, a request for pushing the content of the third type is sent to the server. According to the request for pushing the content of the third type, the server pushes the content of the third type to the terminal. The terminal receives the content of the third type pushed by the server and plays the same.

In another approach, the terminal sends the third voice to the server. The server receives the third voice, and pushes the content of the third type to the terminal according to the third voice. Specifically, the server recognizes the third voice, determines that the third voice instructs the terminal to switch the played content to the content of the third type, and pushes the content of the third type to the terminal. The terminal receives the content of the third type pushed by the server and plays the same.

It can be understand that a period that the terminal in c1 plays the content of the third type is a period during which the terminal is being used.

c2: The terminal continues to play the content of the first type after finishing the playback of the content of the predefined type during a predefined period.

That is, when the user's feedback on the first reply voice by the user is a feedback with an intention to update, the target type is the first type.

Those skilled will appreciate that, next time the user uses the terminal, the terminal will still continue to play the content of the first type after finishing the playback of the content of the predefined type, until the type of the content played by the terminal is updated.

Next, explanations will be given to subsequent voice processing methods when the fourth voice has been acquired by the terminal as the user's feedback on the first reply voice.

At least one of the steps d1 to d3 may be included in a subsequent voice processing method when the fourth voice has been acquired by the terminal as the user's feedback on the first reply voice.

d1: The terminal plays the content of the second type.

In an approach, the terminal recognizes the fourth voice after acquiring the same, and determines that the fourth voice does not indicate any play type.

The terminal sends a request for pushing the content of the second type to the server after determining that the fourth voice does not indicate any play type. According to the request for pushing the content of the second type, the server pushes the content of the second type to the terminal. The terminal receives the content of the second type pushed by the server and plays the same.

In another approach, the terminal sends the fourth voice to the server. The server receives the fourth voice, and pushes the content of the second type to the terminal according to the fourth voice. Specifically, the server recognizes the fourth voice, determines that the fourth voice does not indicate any play type, and pushes the content of the second type to the terminal. The terminal receives the content of the second type pushed by the server and plays the same.

d2: The terminal plays a third reply voice according to the fourth voice.

In an approach, the terminal determines and plays the third reply voice according to the fourth voice after determining that the fourth voice does not indicate any play type.

In another approach, the terminal sends the fourth voice to the server. The server receives the fourth voice, determines the third reply voice according to the fourth voice according to the fourth voice, and sends the third reply voice to the terminal. Specifically, the server recognizes the fourth voice, determines the third reply voice according to the fourth voice after determining that the fourth voice does not indicate any play type, and sends the third reply voice to the terminal. The terminal receives the third reply voice and plays the same.

The d2 is optional. If d2 is included, the terminal plays the content of the second type after the terminal plays the third reply voice.

d3: The terminal continues to play the content of the first type after finishing the playback of the content of the predefined type during the predefined period.

Those skilled will appreciate that, next time the user uses the terminal, the terminal will still continue to play the content of the first type after finishing the playback of the content of the predefined type, until the type of the content played by the terminal is updated.

In the foregoing, explanations have been given to the voice processing methods corresponding to the cases when the feedback on the first reply voice is the second voice, the third voice or the fourth voice. Other than the second voice, the third voice or the fourth voice, the feedback on the first reply voice may also include the following.

Since a playtime of the first reply voice, if no voice inputted by the user is acquired by the terminal during the first predefined duration (i.e., no reply to the first reply voice is acquired from the user), the terminal plays the content of the second type.

In an approach, the terminal determines that no voice inputted by the user is acquired during the first predefined duration since the playtime of the first reply voice, and sends a request for pushing the content of the second type to the server. According to the request for pushing the content of the second type, the server pushes the content of the second type to the terminal. The terminal plays the content of the second type pushed by the server after receiving the same.

In another approach, the server fails to receive any voice sent by the terminal during a third predefined duration since the playtime of the first reply voice, and determines that the user's feedback on the first reply voice is no reply to the first reply voice. The server pushes the content of the second type to the terminal. The terminal plays the content of the second type after receiving the same. The third predefined duration may be the same as, or different from, the first predefined duration.

In still another approach, the terminal determines that no voice inputted by the user is acquired during the first predefined duration since the playtime of the first reply voice, and sends notification information to the server, where the notification information indicates that no voice inputted by the user is acquired by the terminal during the first predefined duration since the playtime of the first reply voice. According to the notification information, the server pushes the content of the second type to the terminal. The terminal plays the content of the second type pushed by the server after receiving the same.

That is, in case that the user makes no reply to the first reply voice, the server pushes the content of the second type to the terminal. The terminal receives the content of the second type pushed by the server, and plays the content of the second type.

In view of the foregoing, the terminal in this embodiment may play a content conforming to the user's need, thereby improving the reliability of the terminal.

Now, a specific embodiment will be employed to explain the interaction process involved in the voice processing method in the embodiment shown in FIG. 2.

Figure 3:
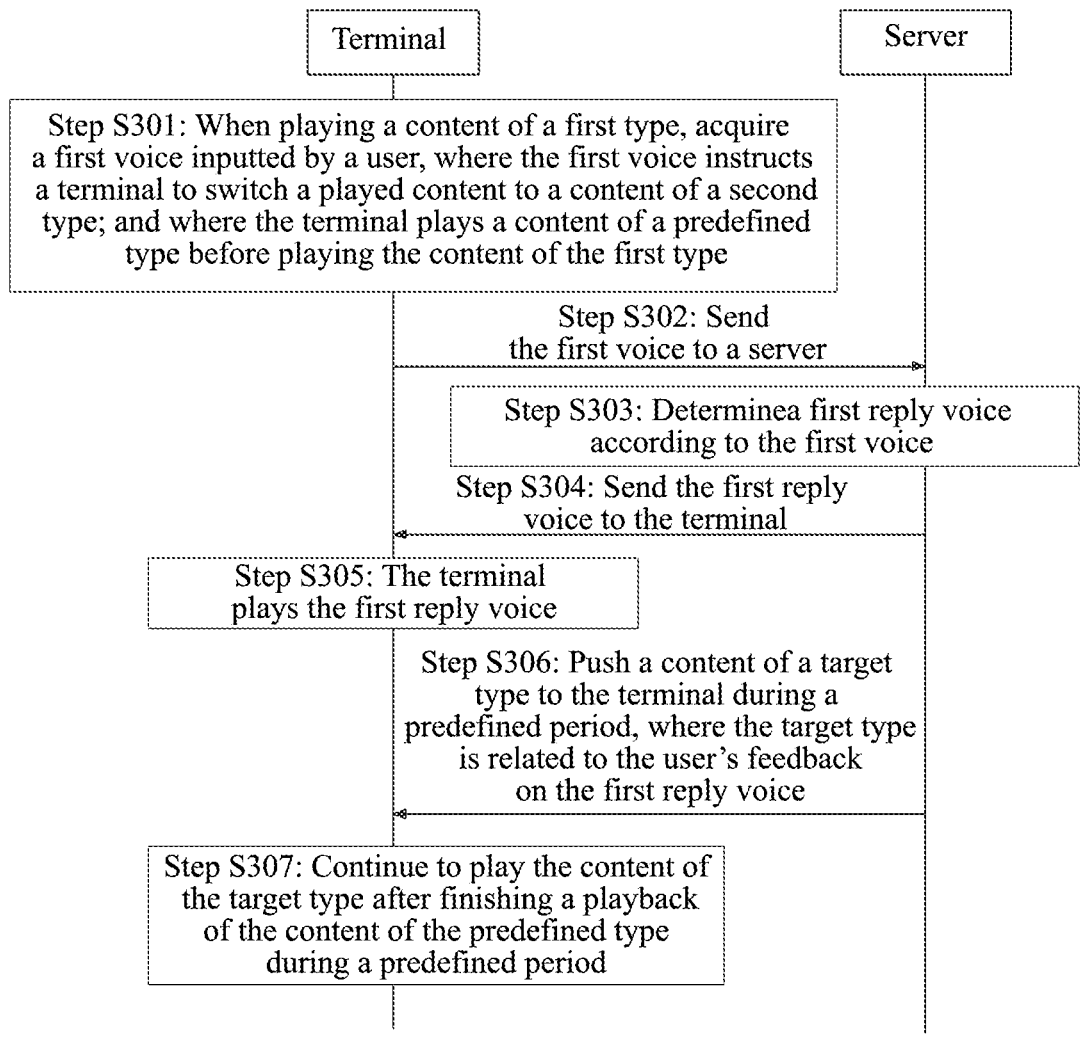
FIG. 3 is a first interaction diagram of a voice processing method provided in an embodiment of the present application.

FIG. 3 is a first interaction diagram of a voice processing method provided in an embodiment of the present application. As shown in FIG. 3, the method of the embodiment may include:

Step S301: When a terminal is playing a content of a first type, the terminal acquires a first voice inputted by a user, where the first voice instructs the terminal to switch a played content to a content of a second type; and where the terminal plays a content of a predefined type before playing the content of the first type.

Step S302: The terminal sends the first voice to a server.

Step S303: The server determines a first reply voice according to the first voice, where the first reply voice is used to ask the user to determine whether to continue to play the content of the second type after finishing a playback of the content of the predefined type during a predefined period.

Step S304: The server sends the first reply voice to the terminal.

Step S305: The terminal plays the first reply voice.

Step S306: The server pushes a content of a target type to the terminal during a predefined period, where the target type is related to the user's feedback on the first reply voice.

Step S307: The terminal continues to play the content of the target type after finishing the playback of the content of the predefined type during the predefined period.

For the specific implementation of the foregoing steps, reference may be made to the description in the embodiment shown in FIG. 2, which will not be repeated herein.

In this embodiment, the terminal may play a content conforming to the user's need, thereby improving a reliability of the terminal.

Now, in conjuncture with FIG. 4, explanations will be given to a voice processing method when the second voice is a user's feedback on a first reply voice, where the second voice is a positive or negative response by the user to the first reply voice.

Figure 4:
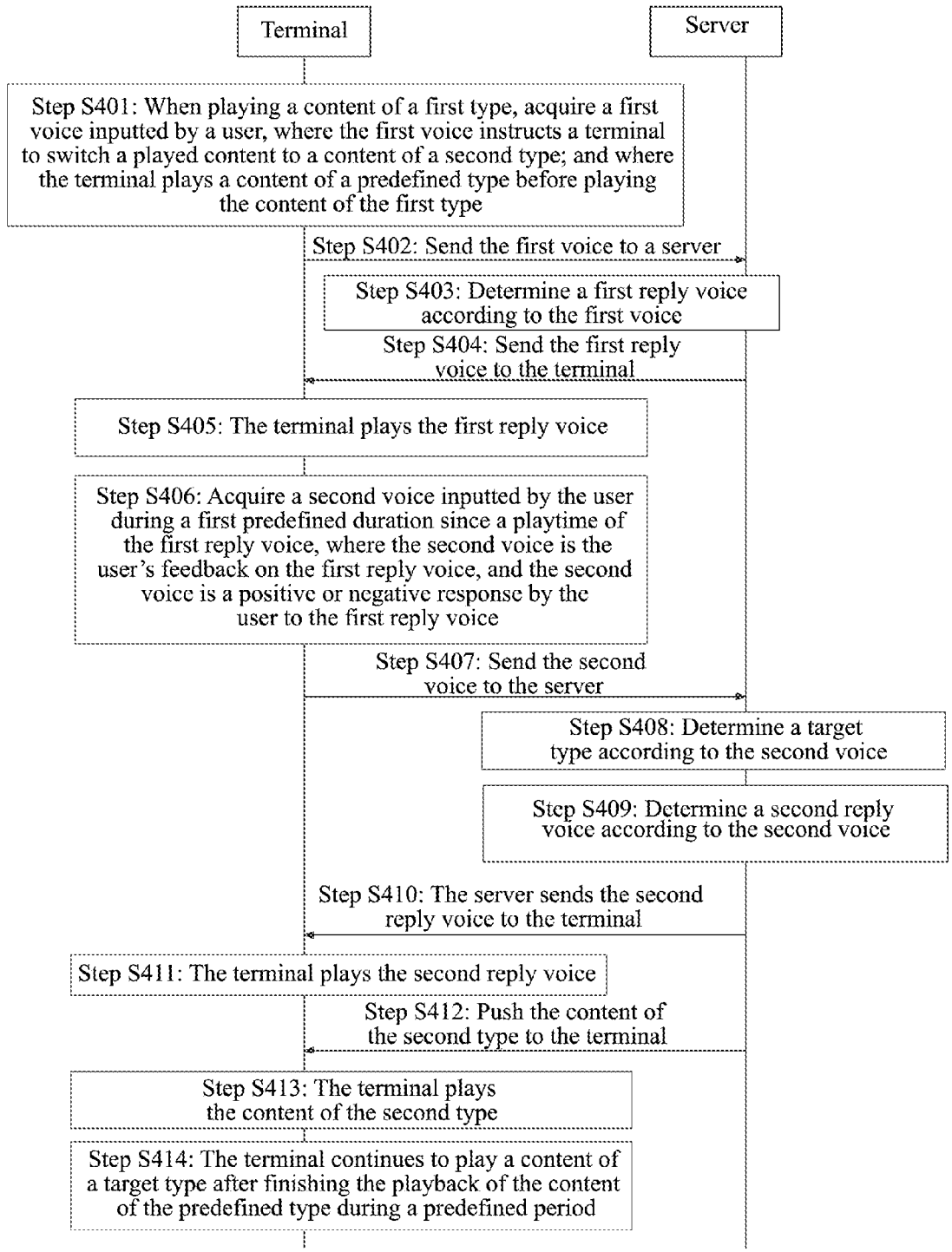
FIG. 4 is a second interaction diagram of a voice processing method provided in an embodiment of the present application.

FIG. 4 is a second interaction diagram of a voice processing method provided in an embodiment of the present application. As shown in FIG. 4, the method of the embodiment may include:

Step S401: When a terminal is playing a content of a first type, the terminal acquires a first voice inputted by a user, where the first voice instructs the terminal to switch a played content to a content of a second type; and where the terminal plays a content of a predefined type before playing the content of the first type.

Step S402: The terminal sends the first voice to a server.

Step S403: The server determines a first reply voice according to the first voice, where the first reply voice is used to ask the user to determine whether to continue to play the content of the second type after finishing a playback of the content of the predefined type during a predefined period.

Step S404: The server sends the first reply voice to the terminal.

Step S405: The terminal plays the first reply voice.

Step S406: The terminal acquires a second voice inputted by the user during a first predefined duration since a playtime of the first reply voice, where the second voice is the user's feedback on the first reply voice, and the second voice is a positive or negative response by the user to the first reply voice.

Step S407: The terminal sends the second voice to the server.

Step S408: The server determines a target type according to the second voice.

Step S409: The server determines a second reply voice according to the second voice.

Step S410: The server sends the second reply voice to the terminal.

Step S411: The terminal plays the second reply voice.

The above steps S409 to S411 are optional.

Step S412: The server pushes the content of the second type to the terminal.

Step S413: The terminal plays the content of the second type.

Step S414: The terminal continues to play a content of a target type after finishing the playback of the content of the predefined type during a predefined period.

For the specific implementation of the foregoing steps, reference may be made to the description in the embodiment shown in FIG. 2, which will not be repeated herein.

In this embodiment, the terminal may play a content conforming to the user's need, thereby improving the reliability of the terminal.

Now, in conjuncture with FIG. 5, explanations will be given to a voice processing method when the third voice is a user's feedback on a first reply voice, where the third voice instructs the terminal to switch a played content to a content of a third type.

Figure 5:
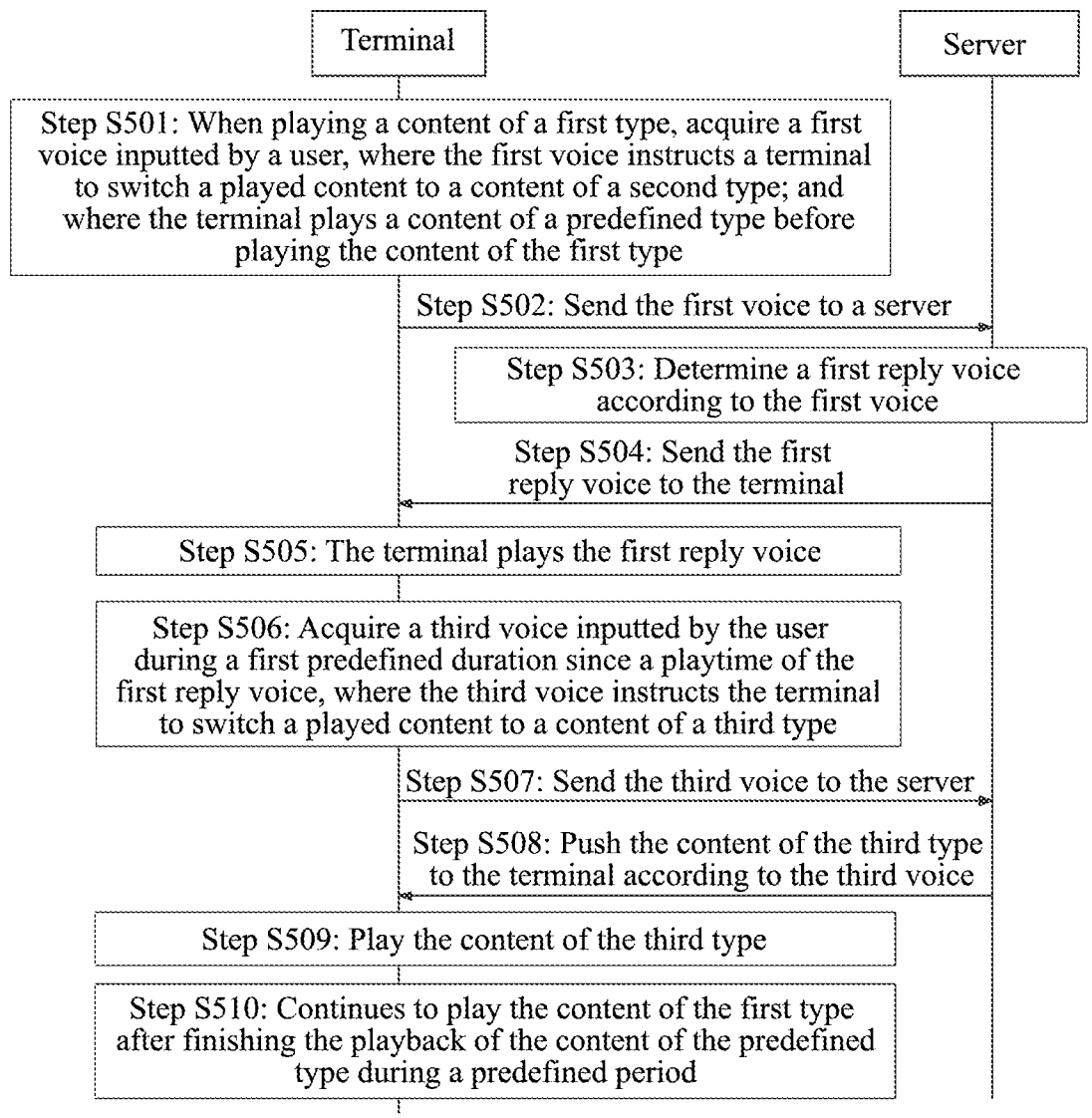
FIG. 5 is a third interaction diagram of a voice processing method provided in an embodiment of the present application.

FIG. 5 is a third interaction diagram of a voice processing method provided in an embodiment of the present application. As shown in FIG. 5, the method of the embodiment may include:

Step S501: When a terminal is playing a content of a first type, the terminal acquires a first voice inputted by a user, where the first voice instructs the terminal to switch a played content to a content of a second type; and where the terminal plays a content of a predefined type before playing the content of the first type.

Step S502: The terminal sends the first voice to a server.

Step S503: The server determines a first reply voice according to the first voice, where the first reply voice is used to ask the user to determine whether to continue to play the content of the second type after finishing a playback of the content of the predefined type during a predefined period.

Step S504: The server sends the first reply voice to the terminal.

Step S505: The terminal plays the first reply voice.

Step S506: The terminal acquires a third voice inputted by the user during a first predefined duration since a playtime of the first reply voice, where the third voice instructs the terminal to switch a played content to a content of a third type.

Step S507: The terminal sends the third voice to the server.

Step S508: The server pushes the content of the third type to the terminal according to the third voice.

Step S509: The terminal plays the content of the third type.

Step S510: The terminal continues to play the content of the first type after finishing the playback of the content of the predefined type during a predefined period.

For the specific implementation of the foregoing steps, reference may be made to the description in the embodiment shown in FIG. 2, which will not be repeated herein.

In this embodiment, the terminal may play a content conforming to the user's need, thereby improving the reliability of the terminal.

Now, in conjuncture with FIG. 6, explanations will be given to a voice processing method when the fourth voice is a user's feedback on a first reply voice, where the fourth voice does not indicate any play type.

Figure 6:
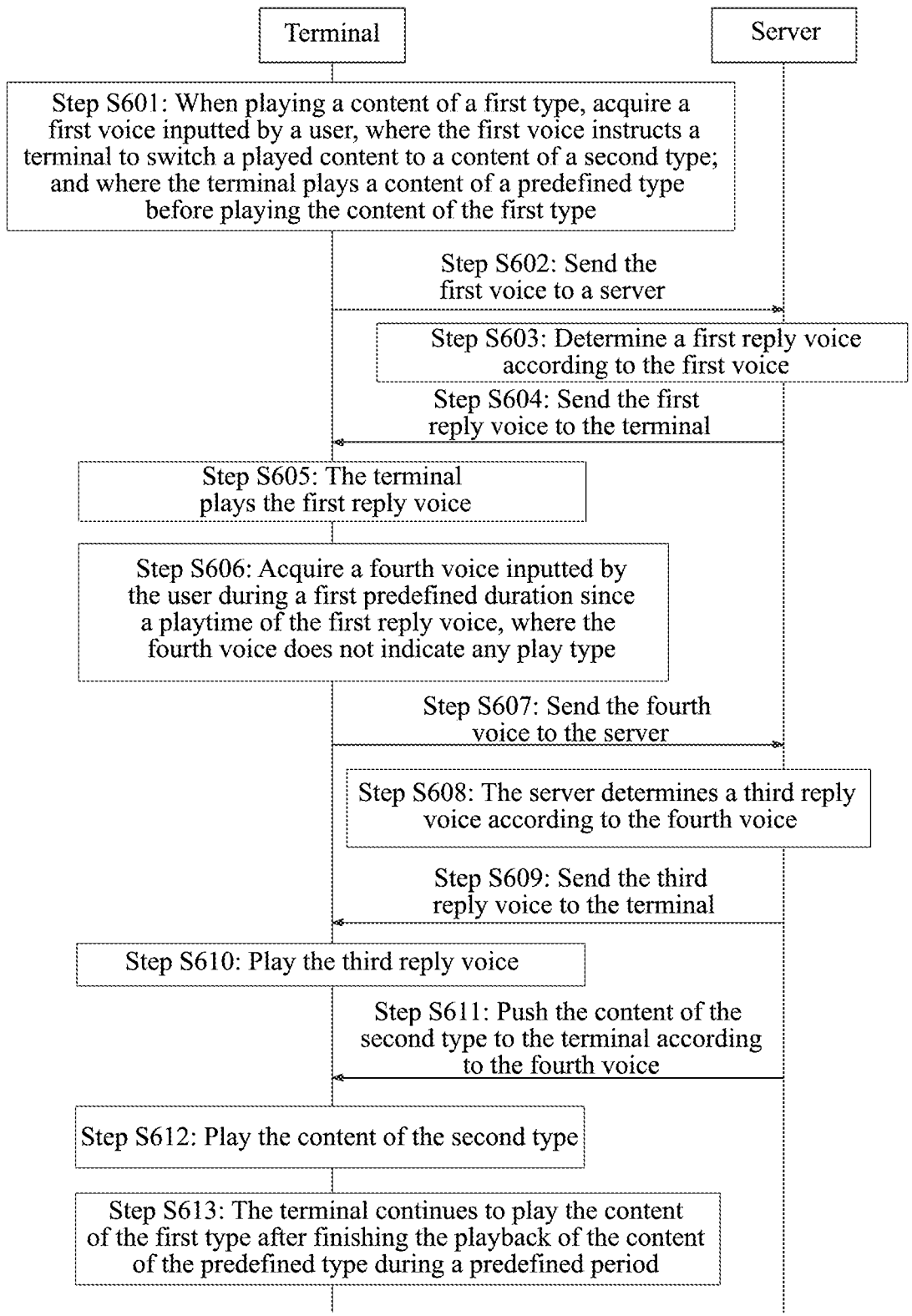
FIG. 6 is a fourth interaction diagram of a voice processing method provided in an embodiment of the present application.

FIG. 6 is a fourth interaction diagram of a voice processing method provided in an embodiment of the present application. As shown in FIG. 6, the method of the embodiment may include:

Step S601: When a terminal is playing a content of a first type, the terminal acquires a first voice inputted by a user, where the first voice instructs the terminal to switch a played content to a content of a second type; and where the terminal plays a content of a predefined type before playing the content of the first type.

Step S602: The terminal sends the first voice to a server.

Step S603: The server determines a first reply voice according to the first voice, where the first reply voice is used to ask the user to determine whether to continue to play the content of the second type after finishing a playback of the content of the predefined type during a predefined period.

Step S604: The server sends the first reply voice to the terminal.

Step S605: The terminal plays the first reply voice.

Step S606: The terminal acquires a fourth voice inputted by the user during a first predefined duration since a playtime of the first reply voice, where the fourth voice does not indicate any play type.

Step S607: The terminal sends the fourth voice to the server.

Step S608: The server determines, according to the fourth voice, a third reply voice in response to the fourth voice.

Step S609: The server sends the third reply voice to the terminal.

Step S610: The terminal plays the third reply voice.

The above steps S608 to S610 are optional.

Step S611: The server pushes the content of the second type to the terminal according to the fourth voice.

Step S612: The terminal plays the content of the second type.

Step S613: The terminal continues to play the content of the first type after finishing the playback of the content of the predefined type during a predefined period.

For the specific implementation of the foregoing steps, reference may be made to the description in the embodiment shown in FIG. 2, which will not be repeated herein.

In this embodiment, the terminal may play a content conforming to the user's need, thereby improving the reliability of the terminal.

In the above, voice processing methods according to embodiments of the present application have been described. Now, voice processing apparatuses according to embodiments of the present application will be described.

Figure 7:
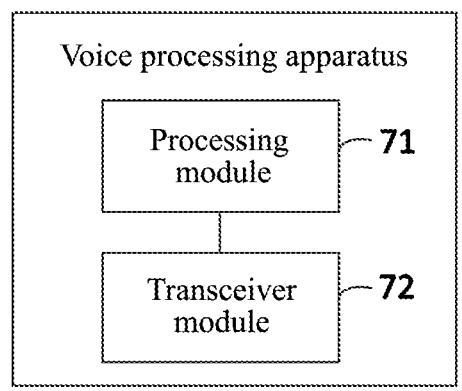
FIG. 7 is a first schematic structural diagram of a voice processing apparatus provided in an embodiment of the present application.

FIG. 7 is a first schematic structural diagram of a voice processing apparatus provided in an embodiment of the present application, where the voice processing apparatus of this embodiment may be a terminal or a component of the terminal. As shown in FIG. 7, the apparatus of this embodiment may include: a processing module 71 and a transceiver module 72.

When the voice processing apparatus is playing a content of a first type, the processing module 71 is configured to acquire a first voice inputted by a user, where the first voice instructs the voice processing apparatus to switch a played content to a content of a second type; where the voice processing apparatus plays a content of a predefined type before playing the content of the first type; the processing module 71 is further configured to play a first reply voice according to the first voice, where the first reply voice is used to ask the user to determine whether to continue to play the content of the second type after finishing a playback of the content of the predefined type during a predefined period; and the processing module 71 is further configured to continue to play a content of a target type after finishing the playback of the content of the predefined type during the predefined period, where the target type is related to the user's feedback on the first reply voice.

Optionally, the transceiver module 72 is configured to send the first voice to a server.

Optionally, the transceiver module 72 is further configured to receive the content of the target type from the server during the predefined period.

Optionally, the processing module 71 being configured to play the first reply voice according to the first voice includes the processing module 71 being specifically configured to: if the first voice includes slot information, play the first reply voice according to the slot information; and if the first voice does not include slot information, play a predefined voice according to the first voice, where the predefined voice is the first reply voice.

Optionally, the transceiver module 71 is further configured to receive from the server the first reply voice according to the first voice.

Optionally, during the predefined period, before the processing module 71 plays the content of the predefined type after finishing the playback of the content of the predefined type, the processing module 71 is further configured to: acquire a second voice inputted by the user during a first predefined duration since a playtime of the first reply voice, where the second voice is the user's feedback on the first reply voice, and the second voice is a positive or negative response by the user to the first reply voice; and determine the target type according to the second voice.

Optionally, the processing module 71 being configured to determine the target type according to the second voice includes the processing module 71 being specifically configured to: determine that the second type is the target type if the second voice is a positive response by the user to the first reply voice; and determine that the first type is the target type if the second voice is a negative response by the user to the first reply voice.

Optionally, the processing module 71 is further configured to play a second reply voice according to the second voice.

Optionally, the transceiver module 72 is further configured to receive from the server a second reply voice according to the second voice.

Optionally, after the processing module 71 acquires the second voice, the processing module 71 is further configured to play the content of the second type.

Optionally, the transceiver module 71 is further configured to send the second voice to a server.

Optionally, the processing module 71 is further configured to: acquire a third voice inputted by the user during a first predefined duration since a playtime of the first reply voice, where the third voice instructs to switch the played content to a content of a third type, and the third voice is the user's feedback on the first reply voice; and play the content of the third type; correspondingly, the target type is the first type.

Optionally, the transceiver module 72 is further configured to send the third voice to a server.

Optionally, the processing module 71 is further configured to play the content of the second type if no reply to the first reply voice is acquired from the user, or if a fourth voice inputted by the user is acquired, during a first predefined duration since a playtime of the first reply voice, where the fourth voice does not indicate any play type, and the fourth voice is the user's feedback on the first reply voice; correspondingly, the target type is the first type.

Optionally, the transceiver module 72 is further configured to receive a content of a second type from the server.

Optionally, the transceiver module 72 is further configured to send a third voice to a server.

Optionally, before the processing module 71 is configured to play the first reply voice according to the first voice, the processing module 71 is further configured to determine that the content of the first type has been played for a duration less than or equal to a second predefined duration.

The apparatus of the embodiment can be used to implement the technical solution corresponding to the terminal of the foregoing method embodiments following similar implementation principles and producing similar technical effects, which will not be repeated herein.

Figure 8:
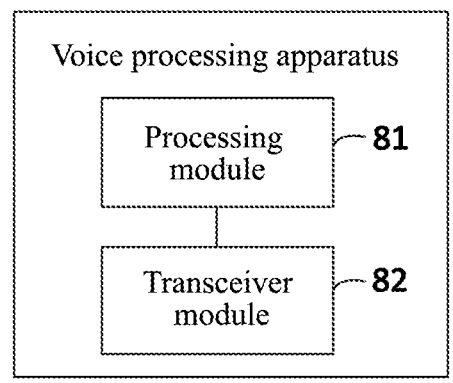
FIG. 8 is a second schematic structural diagram of a voice processing apparatus provided in an embodiment of the present application.

FIG. 8 is a second schematic structural diagram of a voice processing apparatus provided in an embodiment of the present application, where the voice processing apparatus of this embodiment may be a server or a component of the server. As shown in FIG. 8, the apparatus of this embodiment may include: a processing module 81 and a transceiver module 82.

When a terminal is playing a content of a first type, the transceiver module 82 is configured to acquire a first voice from the terminal, where the first voice instructs the terminal to switch a played content to a content of a second type; and where the terminal plays a content of a predefined type before playing the content of the first type; the processing module 81 is configured to acquire a first reply voice according to the first voice, the transceiver module 82 is further configured to send the first reply voice to the terminal to enable the terminal to play the first reply voice, where the first reply voice is used to ask the user to determine whether to continue to play the content of the second type after finishing a playback of the content of the predefined type during a predefined period; the transceiver module 82 is further configured to push a content of a target type to the terminal during the predefined period, where the target type is a type of a content that the terminal continues to play after finishing the playback of the content of the predefined type during the predefined period, the target type is related to the user's feedback on the first reply voice.

Optionally, the processing module 81 being configured to acquire the first reply voice according to the first voice includes the processing module 81 is specifically configured to: if the first voice includes slot information, determine the first reply voice according to the slot information, and if the first voice does not include slot information, determine that a predefined voice is the first reply voice according to the first voice.

Optionally, the transceiver module 82 is further configured to receive a second voice from the terminal, where the second voice is the user's feedback on the first reply voice, and the second voice is a positive or negative response by the user to the first reply voice; and the processing module 81 is further configured to determine the target type according to the second voice.

Optionally, the processing module 81 being configured to determine the target type according to the second voice includes the processing module 81 being specifically configured to: determine that the second type is the target type if the second voice is a positive response by the user to the first reply voice, and determine that the first type is the target type if the second voice is a negative response by the user to the first reply voice.

Optionally, the transceiver module 82 is further configured to push the content of the second type to the terminal to enable the terminal to play the content of the second type.

Optionally, the transceiver module 82 is further configured to receive a third voice from the terminal, where the third voice is the user's feedback on the first reply voice, and the third voice instructs the terminal to switch the played content to a content of a third type; and push, according to the third voice, the content of the third type to the terminal to enable the terminal to play the content of the third type; correspondingly, the target type is the first type.

Optionally, the transceiver module 82 is further configured to receive a fourth voice from the terminal, where the fourth voice is the user's feedback on the first reply voice and the fourth voice does not indicate any play type; and push, according to the fourth voice, the content of the second type to the terminal to enable the terminal to play the content of the second type; correspondingly, the target type is the first type.

Optionally, in case that the user makes no reply to the first reply voice, the transceiver module 82 is further configured to push the content of the second type to the terminal to enable the terminal to play the content of the second type; correspondingly, the target type is the first type.

Optionally, before the processing module 81 is configured to acquire the first reply voice according to the first voice, the processing module 81 is further configured to determine that the content of the first type has been played by the terminal for a duration less than or equal to a second predefined duration.

The apparatus of the embodiment can be used to implement the technical solution of the foregoing method embodiments following similar implementation principles and producing similar technical effects, which will not be repeated herein.

Figure 9:
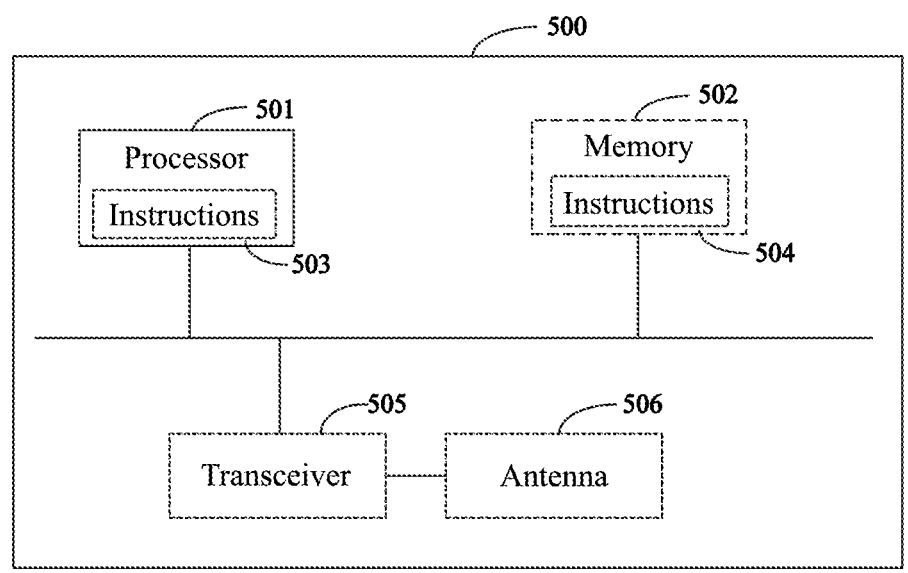
FIG. 9 is a schematic structural diagram of an apparatus provided in an embodiment of the present application.

FIG. 9 is a structural diagram of an apparatus provided in an embodiment of the present application. Referring to FIG. 9, the apparatus 500 may be a server or a terminal, or a chip, a chip system or a processor that supports the server or the terminal to implement the foregoing methods, or a chip, a chip system or a processor that supports implementing the foregoing methods. The apparatus may be used to implement the method corresponding to the server or the terminal described in the foregoing method embodiments. For details, reference may be made to the description in the foregoing method embodiments.

The apparatus 500 may include one or more processors 501, which may also be referred to as processing units, and can implement certain control functions. The processor 501 may be a general purpose processor or a dedicated processor or the like. For example, it can be a baseband processor or a central processor. The baseband processor can be used to process communication protocols and communication data. The central processor can be used to control a communication device (e.g., a base station, a baseband chip, a terminal, a terminal chip, a Distributed Unit (DU) or Centralized Unit (CU), etc.), execute a software program, and process software program data.

In an alternative design, the processor 501 may also store thereon instructions and data 503 that may be executed by the processor 501 to enable the apparatus 500 to perform the method embodiments described above.

In another alternative design, the processor 501 may include a transceiver unit for implementing receiving and transmitting functions. For example, the transceiver unit can be a transceiver circuit, or an interface, or an interface circuit. The transceiver circuit, interface or interface circuit for implementing the receiving and transmitting functions may be separated or integrated together. The above transceiver circuit, interface or interface circuit can be used for reading and writing code/data. Or, the above transceiver circuit, interface or interface circuit can be used for signal transmission or transfer.

In still another possible design, the apparatus 500 may include a circuit that can implement the receiving or transmitting or communicating functions in the foregoing method embodiments.

Optionally, the apparatus 500 may include one or more memories 502 on which instructions 504 may be stored, the instructions is executable on the processor to enable the apparatus 500 to perform the methods described in the above method embodiments. Optionally, the memories may also store data thereon. Optionally, the processor may also store thereon instructions and data. The processor and the memory may be provided separately, or be integrated together. For example, the corresponding relations described in the above method embodiments may be stored in a memory or in a processor.

Optionally, the apparatus 500 may further include a transceiver 505 and/or an antenna 506. The processor 501 may be referred to as a processing unit, and controls the apparatus 500. The transceiver 505 may be referred to as a transceiver unit, a transceiver, a transceiver circuit, or a transceiver device, or the like, and is used for implementing transmitting and receiving functions.

The present application also provides a computer readable storage medium storing thereon a computer program which, when executed by a processor, implement the method corresponding to the terminal in the foregoing method embodiments or the method corresponding to the server in the foregoing method embodiments.

It is to be understood that the "embodiment" referred to throughout the specification means that a particular feature, structure, or characteristic relating to an embodiment is included in at least one embodiment of the present application. Therefore, the various embodiments are not necessarily referring to the same embodiment throughout the specification. In addition, these particular features, structures or characteristics may be combined in any suitable manner in one or more embodiments. It should be understood that, in various embodiments of the present application, the magnitude of the sequence numbers in various processes above does not mean the sequence in the order of execution. Rather, the order of execution of each process should be determined by its function and internal logic, and should not constitute any limitation over the implementation processes in embodiments of the present application.

It should also be understood that in the present application, the terms "when", "if" and "in case that" all indicate that the terminal or server will perform a corresponding process under a particular objective condition, rather than a limitation over the timing, or that the terminal or server has to act in a decision making, or a limitation in any other way.

Elements in the present application that are used in the singular are intended to mean "one or more" rather than "one and only one", unless specified otherwise. In the present application, unless specified otherwise, "at least one" is intended to mean "one or more", and "multiple" is intended to mean "two or more".

As used herein, the term "and/or" merely describes a relation between related objects, representing three possible relations. For instance, "A and/or B" may represent three cases: A alone, A and B together, and B alone, where A may be singular or plural, and B may be singular or plural.

The terms "at least one of" or "at least one of", as used herein, denote all or any combination of the entailing items. For example, "at least one of A, B and C" can denote seven cases: A exists alone, B exists alone, C exists alone, A and B exist at the same time, B and C exist at the same time, A and C exist at the same time, and A, B and C exist at the same time, where A may be singular or plural, B may be singular or plural, and C may be singular or plural.

It should be understood that, in various embodiments of the present application, "B corresponding to A" means that B is associated with A, and B can be determined according to A. However, it should also be understood that determining B from A does not mean that B is determined based on A only. Rather, B can also be determined based on at least one of A and other information.

It will be understood by those skilled in the art that all or part of the steps of the foregoing method embodiments may be implemented by hardware in relation to program instructions. The program may be stored in a computer readable storage medium. The program, when executed, executes steps incorporating the foregoing method embodiments, and the foregoing storage medium includes various media that can store program codes, such as a ROM, a RAM, a magnetic disk, or an optical disk.

Finally, it should be noted that the foregoing embodiments are merely intended for describing, rather than limiting, the technical solutions of the present disclosure. Although the present disclosure is described in detail with reference to the foregoing embodiments, persons of ordinary skill in the art should understand that they may still make modifications to the technical solutions described in the foregoing embodiments, or make equivalent replacements to some or all technical features therein; however, these modifications or replacements do not make the essence of corresponding technical solutions depart from the scope of the technical solutions in the embodiments of the present disclosure.

What is claimed is:

1. A voice processing method, comprising:
    when a terminal is playing a content of a first type, acquiring, by the terminal, a first voice inputted by a user, wherein the first voice instructs the terminal to switch a played content to a content of a second type; and wherein the terminal plays a content of a predefined type before playing the content of the first type;
    playing, by the terminal, a first reply voice according to the first voice, wherein the first reply voice is used to ask the user to determine whether to continue to play the content of the second type after finishing a playback of the content of the predefined type during a predefined period; and
    continuing to play, by the terminal, a content of a target type after finishing the playback of the content of the predefined type during the predefined period, wherein the target type is related to the user's feedback on the first reply voice;

wherein the playing, by the terminal, a first reply voice according to the first voice comprises:

if the first voice comprises slot information, playing, by the terminal, the first reply voice according to the slot information; and if the first voice does not comprise slot information, playing, by the terminal, a predefined voice according to the first voice, wherein the predefined voice is the first reply voice.

2. The method according to claim 1, before the continuing to play, by the terminal, a content of a target type after finishing the playback of the content of the predefined type during the predefined period, further comprising:

acquiring, by the terminal, a second voice inputted by the user during a first predefined duration since a playtime of the first reply voice, wherein the second voice is the user's feedback on the first reply voice, and the second voice is a positive or negative response by the user to the first reply voice; and determining, by the terminal, the target type according to the second voice.

3. The method according to claim 2, wherein the determining, by the terminal, the target type according to the second voice comprises:

if the second voice is a positive response by the user to the first reply voice, determining, by the terminal, that the second type is the target type; and if the second voice is a negative response by the user to the first reply voice, determining, by the terminal, that the first type is the target type; and playing, by the terminal, a second reply voice according to the second voice.

4. The method according to claim 2, after the acquiring, by the terminal, a second voice, further comprising:

playing, by the terminal, the content of the second type.

5. The method according to claim 1, further comprising:

acquiring, by the terminal, a third voice inputted by the user during a first predefined duration since a playtime of the first reply voice, wherein the third voice instructs the terminal to switch the played content to a content of a third type, and the third voice is the user's feedback on the first reply voice; and playing, by the terminal, the content of the third type;

wherein the target type is the first type.

6. The method according to claim 1, further comprising:

playing, by the terminal, the content of the second type if no reply to the first reply voice is acquired from the user, or if a fourth voice inputted by the user is acquired, by the terminal during a first predefined duration since a playtime of the first reply voice, wherein the fourth voice is the user's feedback on the first reply voice and the fourth voice does not indicate any play type;

wherein the target type is the first type.

7. The method according to claim 1, before the playing, by the terminal, a first reply voice according to the first voice, further comprising:

determining, by the terminal, that the content of the first type has been played for a duration less than or equal to a second predefined duration.

8. The method according to claim 1, wherein the predefined period is a period after a current date.

9. A voice processing method, comprising:

when a terminal is playing a content of a first type, receiving, by a server, a first voice from the terminal, wherein the first voice instructs the terminal to switch a played content to a content of a second type; and wherein the terminal plays a content of a predefined type before playing the content of the first type;

acquiring, by the server, a first reply voice according to the first voice; sending, by the server, the first reply voice to the terminal to enable the terminal to play the first reply voice, wherein the first reply voice is used to ask the user to determine whether to continue to play the content of the second type after finishing a playback of the content of the predefined type during a predefined period; and pushing, by the server, a content of a target type to the terminal during the predefined period, wherein the target type is a type of a content that the terminal continues to play after finishing the playback of the content of the predefined type during the predefined period, the target type is related to the user's feedback on the first reply voice;

wherein the acquiring, by the server, a first reply voice according to the first voice comprises:

if the first voice comprises slot information, determining, by the server, the first reply voice according to the slot information; and if the first voice does not comprise slot information, determining, by the server, that a predefined voice is the first reply voice according to the first voice.

10. The method according to claim 9, further comprising:

receiving, by the server, a second voice from the terminal, wherein the second voice is the user's feedback on the first reply voice, and the second voice is a positive or negative response by the user to the first reply voice; and determining, by the server, the target type according to the second voice.

11. The method according to claim 10, wherein the determining, by the server, the target type according to the second voice comprises:

if the second voice is a positive response by the user to the first reply voice, determining, by the server, that the second type is the target type; and if the second voice is a negative response by the user to the first reply voice, determining, by the server, that the first type is the target type.

12. The method according to claim 10, further comprising:

pushing, by the server, the content of the second type to the terminal to enable the terminal to play the content of the second type.

13. The method according to claim 9, further comprising:

receiving, by the server, a third voice from the terminal, wherein the third voice is the user's feedback on the first reply voice, and the third voice instructs the terminal to switch the played content to a content of a third type; and pushing, by the server according to the third voice, the content of the third type to the terminal to enable the terminal to play the content of the third type;

wherein the target type is the first type.

14. The method according to claim 9, further comprising:

receiving, by the server, a fourth voice from the terminal, wherein the fourth voice is the user's feedback on the first reply voice and the fourth voice does not indicate any play type; and pushing, by the server according to the fourth voice, the content of the second type to the terminal to enable the terminal to play the content of the second type;
wherein the target type is the first type.

15. The method according to claim 9, in case the user makes no reply to the first reply voice, further comprising:
pushing, by the server, the content of the second type to the terminal to enable the terminal to play the content of the second type;
wherein the target type is the first type.

16. The method according to claim 9, before the acquiring, by the server, a first reply voice according to the first voice, further comprising:
determining, by the server, that the content of the first type has been played by the terminal for a duration less than or equal to a second predefined duration.

17. A terminal, comprising: a memory and a processor; wherein the memory is connected to the processor;
the memory is configured to store program instructions; and
the processor is configured to implement the method according to claim 1 when the program instructions are executed.

18. A server, comprising: a memory and a processor; wherein the memory is connected to the processor;
the memory is configured to store program instructions; and
the processor is configured to implement the method according to claim 9 when the program instructions are executed.

19. A voice processing method, comprising:
when a terminal is playing a content of a first type, acquiring, by the terminal, a first voice inputted by a user, wherein the first voice instructs the terminal to switch a played content to a content of a second type; and wherein the terminal plays a content of a predefined type before playing the content of the first type;
playing, by the terminal, a first reply voice according to the first voice, wherein the first reply voice is used to ask the user to determine whether to continue to play the content of the second type after finishing a playback of the content of the predefined type during a predefined period; and
continuing to play, by the terminal, a content of a target type after finishing the playback of the content of the predefined type during the predefined period, wherein the target type is related to the user's feedback on the first reply voice;
wherein, before the playing, by the terminal, a first reply voice according to the first voice, the voice processing method further comprises:
determining, by the terminal, that the content of the first type has been played for a duration less than or equal to a second predefined duration.

\* \* \* \* \*